United States Patent [19]

Elwick

[11] 3,788,052

[45] Jan. 29, 1974

[54] GROUND ENGAGING HAY BALE ROLLING APPARATUS

[75] Inventor: Keith D. Elwick, Vinton, Iowa

[73] Assignee: Starling, Inc., Harvard, Ill.

[22] Filed: Nov. 9, 1972

[21] Appl. No.: 305,152

[52] U.S. Cl............... 56/341, 56/16.4, 56/362
[51] Int. Cl............................. A01d 39/00
[58] Field of Search ........ 56/1, 8, 9, 16.4, 341–343, 56/362, 363

[56] References Cited
UNITED STATES PATENTS

| | | | |
|---|---|---|---|
| 520,059 | 5/1894 | Keith | 56/362 |
| 581,735 | 5/1897 | Keller | 56/362 |
| 2,502,046 | 3/1950 | Johnson | 56/362 |
| 3,507,139 | 10/1962 | Lane et al. | 56/8 |
| 3,110,145 | 11/1963 | Avery | 56/1 |
| 3,587,218 | 6/1971 | Geary | 56/343 |
| 3,650,100 | 3/1972 | Swan | 56/341 |
| 3,680,296 | 8/1972 | Beebout | 56/16.4 |

*Primary Examiner*—Russell R. Kinsey
*Attorney, Agent, or Firm*—Hofgren, Wegner, Allen, Stellman & McCord

[57] ABSTRACT

A hay bale rolling apparatus adapted to be moved along a windrow of hay to roll the windrow into a series of separate bales in contact with the ground. A bale rolling chamber is open at the bottom, and parallel, curved baling bars are suspended in the chamber, extending from the rear lower portion to the front upper portion. The bars are arranged alternately in two sets which are longitudinally oscillated in vertical planes in opposite phase so as to alternately contact the hay and push it forward with a rolling action as the apparatus moves along a windrow.

13 Claims, 5 Drawing Figures

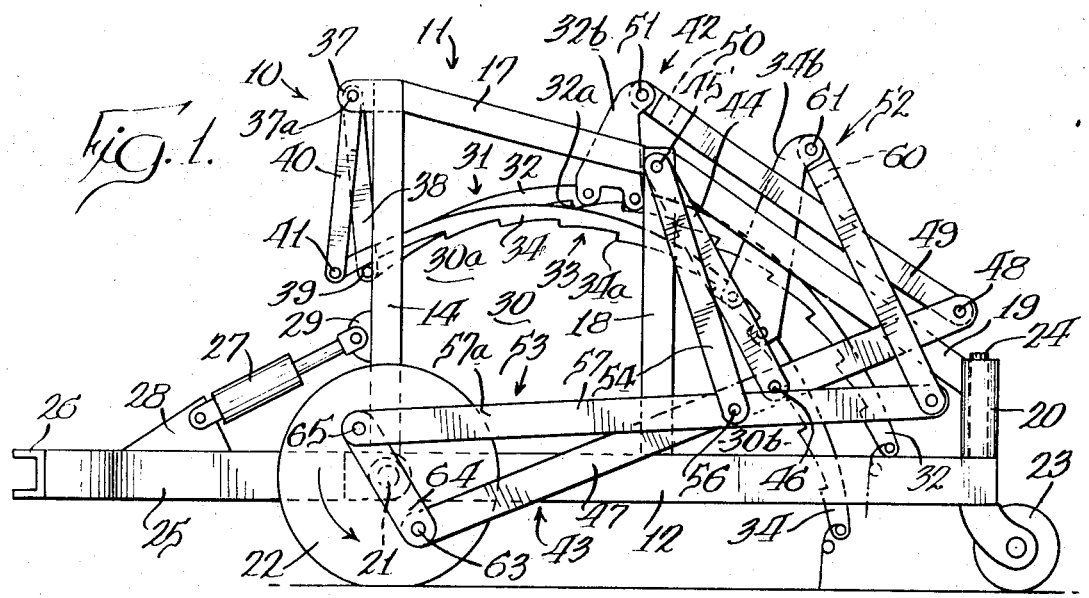
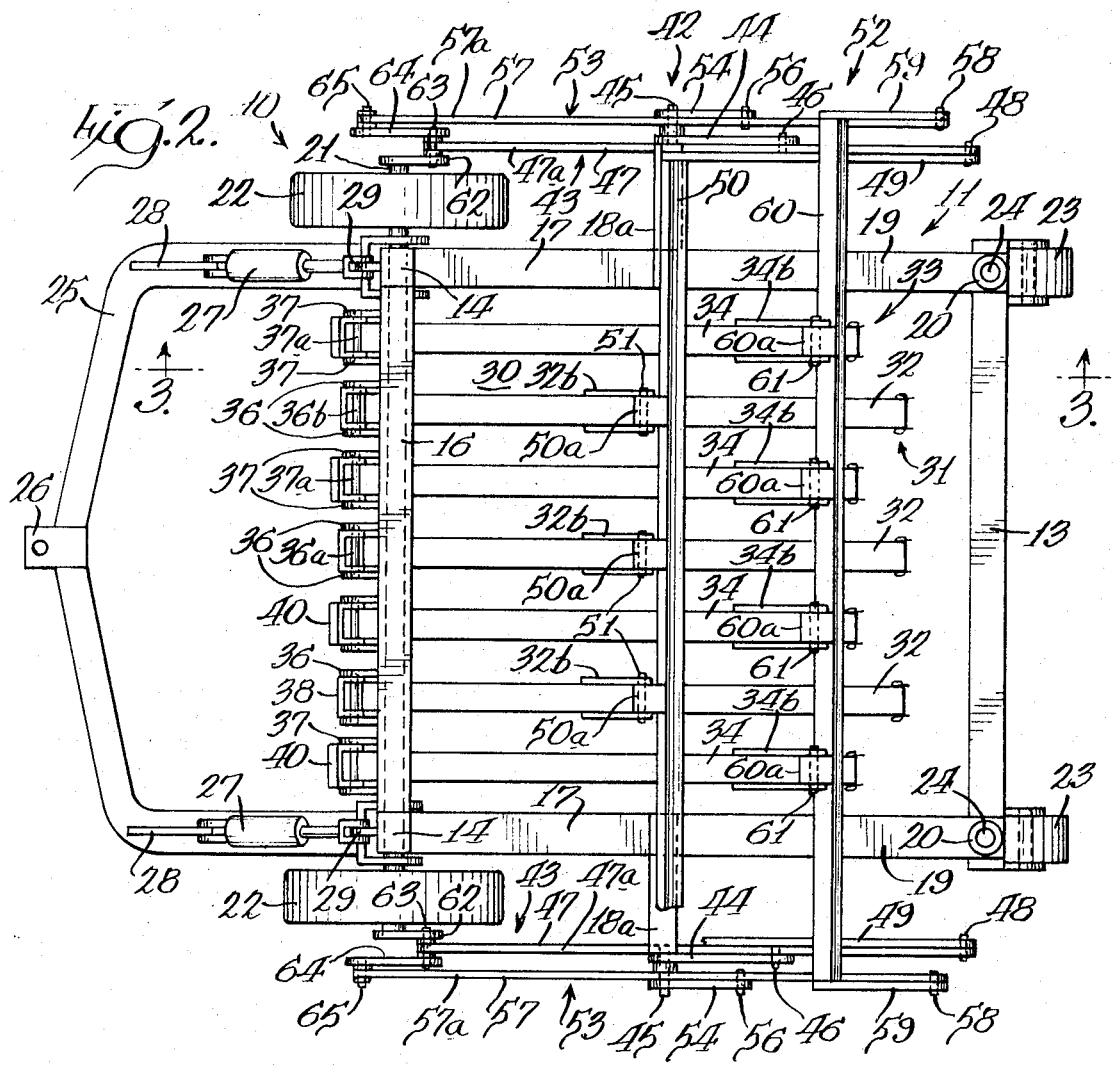

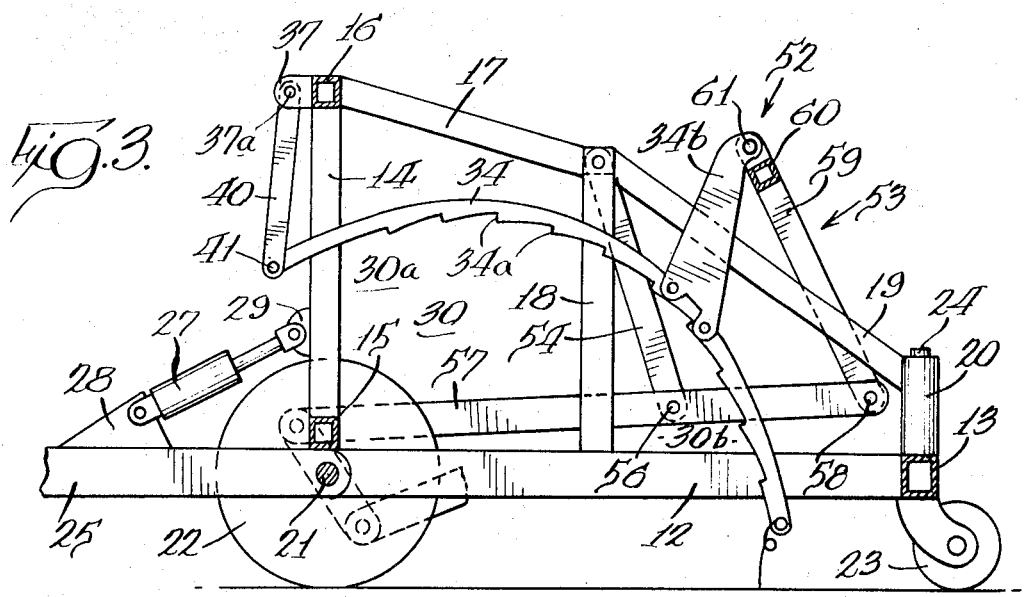
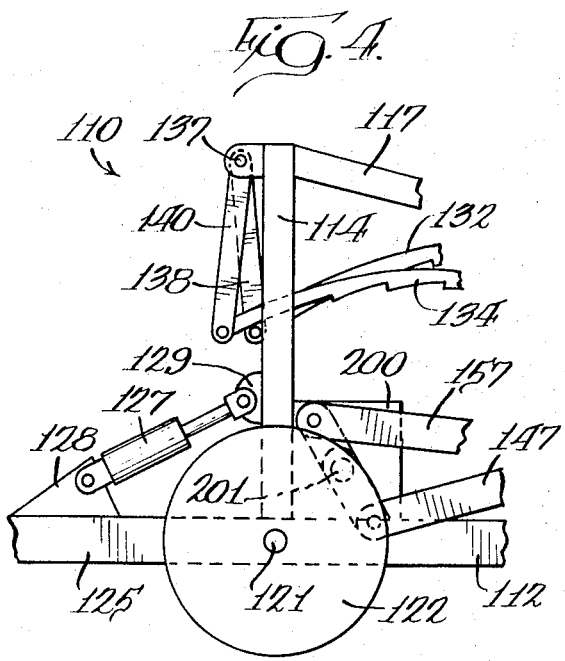
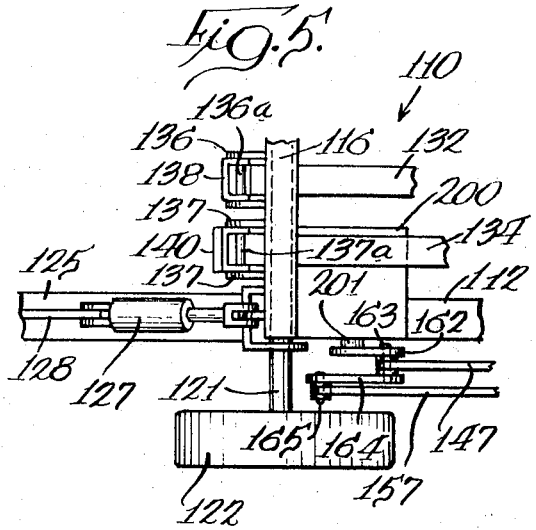

3,788,052

GROUND ENGAGING HAY BALE ROLLING APPARATUS

BACKGROUND OF THE INVENTION

Present day systems for handling forage crops and for feeding livestock have made it apparent that balers of the type which roll a windrow or swath of hay into bales in contact with the ground are admirably suited to such arrangement. The first known prior art patent which discloses such a baler is Avery U.S. Pat. No. 3,110,145 and its counterpart Australian and British patents.

More recently Sherman Swan, now deceased, of Jeffersontown, Kentucky, developed a baler which is illustrated and the operation of which is described in the Progressive Farmer (Kentucky and West Virginia edition) Vol. 86 No. 5 (May 1971 Page 16). The Avery baler and the Swan baler function upon substantially different operating principles, each of which has its own particular advantages and disadvantages. Both of the devices, however, form the hay into manageable bales which can be handled with a fork lift.

SUMMARY OF THE INVENTION

The principal object of the present invention is to provide novel apparatus for rolling a windrow of hay into a series of separate bales in contact with the ground. As used herein, of course, the word "hay" is intended to include all fodder crops which are windrowed and are capable of being rolled into a bale. The word "windrow" includes a swath.

In accordance with the present invention, a hay bale rolling apparatus has a frame which affords a bale rolling chamber that is open at the bottom. Parallel, curved baling bars are suspended in the chamber, with their front ends hung from links at the upper portion of the frame for longitudinal swinging movement, and their rear ends near the bottom of the chamber and suspended on linkage means so that the rear portion of each baling bar moves longitudinally in a closed path. The bars are arranged alternately in two sets, with separate linkage means for each set, and the linkages are driven to oscillate the two sets of baling bars in opposite phase.

The motion of each linkage means is derived from one of two pivots which are on a rotary driven member 180° apart. The rotary driven member may be driven from a ground engaging wheel or from a separate hydraulic motor.

In operation, the sets of baling bars, operating in opposite phase, alternately contact the hay in a windrow and roll it forward with a bale forming action as the baler is moved along a windrow.

The apparatus is basically simple, it eliminates the need for belts which necessarily wear with continuing use, and which also may cause difficulties because hay can get above the belts and stick on the rollers around which the belts are trained.

THE DRAWINGS

FIG. 1 is a side elevational view of a hay bale rolling apparatus embodying the invention, with the baling bars driven by a ground engaging wheel;

FIG. 2 is a plane view of the apparatus of FIG. 1 with parts broken away for clarity of illustration;

FIG. 3 is a longitudinal sectional view taken substantially as indicated along the line 3—3 of FIG. 2 so as to clearly show the mounting and operating linkage for one set of baling bars;

FIG. 4 is a fragmentary side elevational view of apparatus embodying the invention, with a hydraulic motor drive; and FIG. 5 is a fragmentary plan view of the apparatus of FIG. 4.

DETAILED DESCRIPTION OF THE INVENTION

Referring to the drawings in detail, and referring first to FIGS. 1 to 3, a baling apparatus, indicated generally at 10, has a frame, indicated generally at 11, and the frame has longitudinal side beams 12, a rear cross beam 13 and upright front corner posts 14 which are connected by bottom cross bars 15 and top cross bars 16. Longitudinal frame top members 17 extend from the tops of the posts 14 to the tops of intermediate posts 18, and inclined rear upper frame members 19 extend from the intermediate posts 18 to short rear posts 20.

Journalled in the front portions of beams 12 and vertically aligned with front posts 14 is a cross shaft 21, and ground engaging supporting wheels 22 are fixedly connected to the shaft 21 as by splines or keyways. The rear of the frame 11 is supported on a pair of caster wheels 23 the swivel frames for which have their spindles 24 extending upwardly through the hollow rear posts 20.

A forwardly extending draft yoke 25 is pivotally connected to the front of the frame 11 on the axis provided by the rotatable transverse shaft 21, and at the front of the yoke 25 is a bifurcated draft connection 26 which is adapted to be connected to the draft means of a farm tractor (not shown).

The pivotal connection between the draft yoke 25 and the frame 11 permits the frame to be tilted forwardly about the axis provided by the rotatable cross shaft 21, and tilting of the frame is accomplished by a pair of hydraulic cylinder and piston units 27 the forward ends of which are pivoted on brackets 28 on the draft yoke 25 and the rearward ends of which are pivotally connected to flanges 29 on the front corner posts 14. The hydraulic cylinder and piston units 27 are controlled from a hydraulic valve (not shown) that is accessible to an operator on the driver's seat of a tractor which is pulling the baler 10. Retraction of the pistons of the units 27 tilts the frame 11 of the baler to elevate its rear end and permit discharge of a finished bale from a baling chamber 30 which is defined by the frame 11, and the baling chamber 30 is open toward the ground so that as the baler is towed along a windrow of hay a bale may be formed in the chamber.

Within the chamber 30 are suspended a first set, indicated generally at 31, of baling bars 32, and a second set, indicated generally at 33, of baling bars 34. The baling bars 32 and 34 extend from the front upper portion 30a of the baling chamber to the rear lower portion 30b of said chamber. As best seen in FIG. 2, the baling bars 32 of the set 31 and the baling bars 34 of the set 33 are arranged alternately across the baler frame, and as seen in FIG. 1 all of the baling bars 32 and 34 are provided in their under surfaces with teeth, indicated at 32a and 34a.

A first set of bifurcated pivot bosses 36 and a second set of bifurcated pivot bosses 37 extend fowardly from the front upper frame member 16 to provide support for the baling bars 32 and 34, respectively. Cross pins 36a in the brackets 36 provide pivotal mountings for channel shaped links 38 the lower ends of which are provided with pivots 39 to support the front ends of the baling bars 32 which form the first set 31 of baling bars, and similar channel shaped links 40 are suspended from pins 37a in the brackets 37 and have pivots 41 at their lower ends to support the front ends of the baling bars 34 forming the second set 33. Thus, the front ends of the baling bars 32 and 34 are supported for longitudinal swinging movement on the links 38 and 40, respectively.

The rear end portions of the baling bars 32 of the set 31 and of the baling bars 34 of the set 33 are suspended from the frame for longitudinal movement in closed paths, as will now be described. A first linkage means, indicated generally at 42, imparts the desired movement to the rear end portions of the first set 31 of baling bars 32; and second linkage means, indicated generally at 52, is similar to the linkage means 42 and imparts the desired motion to the set 33 of baling bars 34. As best seen in FIG. 2, the linkage means 42 consists of duplicate linkages, indicated generally at 43, on the two sides of the frame 11; while the linkage means 52 consists of duplicate linkages, indicated generally at 53, on the two sides of the frame. Since a description of one of the linkages 43 and one of the linkages 53 will suffice for both linkage means, a single description of each such linkage is given and duplicate reference numerals are applied to the corresponding linkages 43 and the corresponding linkages 53.

Referring to FIG. 1, each linkage 43 includes a guide link 44 which is mounted on a bracket 18a (FIG. 2) which extends outwardly from the upper end of one of the intermediate frame posts 18. At the lower end of the guide link 44 is a pivot 46 which is connected intermediate the ends of a generally longitudinally extending drive link 47 the rear end of which carries a pivot 48 for a connecting link 49. As best seen in FIG. 2, the upper ends of the two connecting links 49 of the linkages 43 are connected by a cross beam 50; and forwardly extending brackets 50a secured to the cross beam 50 receive pivots 51 to which the baling bars 32 are directly pivotally connected through integral upright arms 32b.

As best seen in FIGS. 2 and 3, the linkages 53 include guide links 54 the upper ends of which are mounted on the same pivots 45 which support the guide links 44. At the lower ends of the guide links 54 are pivots 56 which are pivotally connected to intermediate portions of drive links 57, and the rear ends of the drive links 57 are provided with pivots 58 to receive the lower ends of connecting links 59. The upper ends of the connecting links 59 in the two linkages 52 are connected by a cross beam 60, and forwardly extending brackets 60a receive pivot pins 61 to which the baling bars 34 are directly, pivotally connected through integral arms 34b.

The drive means for the linkage means 42 and 52 is best seen in FIG. 2 to consist of a pair of crank arms 62 which are fixedly mounted at opposite ends of the rotatable shaft 21 and have pivots 63 which are coaxial and which are journalled in forward extensions 47a of the drive links 47. Also journalled on the pivots 63 are cranks 64 which have pivots 65 at their outer ends which are also coaxial with one another and which are journalled in forward extensions 57a of the drive links 57. Thus, the pivots 63 and 65 are equidistant from the driven shaft 21, and as the baler 10 is moved along a windrow of hay the linkage means 42 and 52 impart the desired motion to the sets 31 and 33, respectively, of baling bars so that the baling bars oscillate in opposite phase and contact the hay in the windrow alternately to push it forward with a rolling action.

Referring now to FIGS. 4 and 5, the apparatus illustrated is substantially identical with the apparatus illustrated in FIGS. 1 to 3, but substitutes a hydraulic drive motor 200 for the drive off the ground engaging wheels. Accordingly, the components of the apparatus of FIGS. 4 and 5 are given the same reference numerals as corresponding components of the apparatus of FIGS. 1 to 3, but one hundred numbers higher.

A frame of a baler 110 includes longitudinal side beams 112, upright front corner posts 114, a top cross beam 116 and a top side frame member 117. A front axle 121 has supporting wheels 122 journalled at its two ends. A draft yoke 125 is pivoted around the front axle 121, and hydraulic cylinder and piston means 127 for tilting the baler frame is pivotally connected at one end to a bracket 128 on the draft yoke 125 and at the other end to a bracket 129 on the front upright frame member 114.

Baling bars 132 of a first set and baling bars 134 of a second set have their front ends pivotally suspended on links 138 and 140, respectively, and said links in turn are pivoted on bifurcated brackets 136 and 137, respectively, on pivots 136a and 137a.

A pair of hydraulic motors 200 are mounted on the two side beams 112, and have outwardly projecting shafts 201 provided with crank arms 162 and 164 having pivots 163 and 165, respectively; and drive links 147 and 157 are, respectively, pivotally connected to the pivots 163 and 165. The hydraulic motors 200 are connected by flexible fluid conduits (not shown) with a single control valve (not shown) which is mounted on the tractor for manual manipulation by the tractor driver. Hydraulic fluid for the motors 200 is furnished by a supply tank (not shown) which may conveniently be mounted upon the draft yoke 125.

One advantage of the hydraulically driven apparatus of FIGS. 4 and 5 is that the supporting wheels 122 may be journalled on the front axle 121 instead of having to be keyed to it as in the ground driven version of the apparatus.

If desired, of course, a single hydraulic motor 200 may be used which has a shaft 201 that includes an extension across the baler frame and has an end portion journalled in a bracket on the opposite side frame beam 112 from that illustrated in the drawings, with the opposite side cranks 162 and 164 operatively connected outside the journal bracket.

The foregoing detailed description is given for clearness of understanding only and no unecessary limitations should be understood therefrom, as modifications will be obvious to those skilled in the art.

I claim:

1. Hay bale rolling apparatus comprising, in combination:
    a wheeled frame defining a baling chamber which is open at the bottom, said frame being adapted to span a windrow of hay and move fowardly therealong;
    a plurality of substantially parallel, arcuate, longitudinal baling bars extending from the rear lower portion to the front upper portion of said chamber, said baling bars having hay engaging teeth in their lower surfaces, and said baling bars being alternately of first and second sets;
means mounting each of said baling bars on the frame for longitudinal oscillating movement in a vertical plane;
and means for oscillating said first and second sets of baling bars in opposite phase.

2. The apparatus of claim 1 in which the means mounting the baling bars includes forward mounting means suspending the front of each baling bar from the frame for longitudinal swinging movement, and first and second rearward mounting means respectively suspending the rearward portions of the baling bars of the two sets from the frame for longitudinal movement in separate closed paths.

3. The apparatus of claim 2 in which each rearward mounting means includes a cross beam, the baling bars of each set are directly pivoted on one of the cross beams, and linkage means mounts each cross beam for movement longitudinally of the frame in a closed path.

4. The apparatus of claim 2 in which the means for oscillating the first and second sets of baling bars includes driven rotary means, and first and second drive means respectively connecting 180° opposed pivots on said rotary means to the first and second rearward mounting means.

5. The apparatus of claim 4 in which the drive means includes a cross shaft journalled in the front of the frame, coaxial pairs of opposed pivots at the ends of said cross shaft, and in which each rearward mounting means comprises a pair of guide links coaxially pivotally suspended from opposite sides of the frame, a pair of connecting links to the rear of said guide links, a cross beam directly connected to the upper ends of said connecting links, a direct pivotal connection between each baling bar of a set and the cross beam for said set, a pair of generally longitudinal drive links which have their rear ends pivotally connected to the connecting links and intermediate points pivotally connected to the guide links, and said drive links having forward extensions directly pivotally connected to one of said coaxial pairs of pivots.

6. The apparatus of claim 4 in which the driven rotary means is drivingly connected to a ground engaging wheel.

7. The apparatus of claim 4 which includes a motor mounted on the frame, and in which the driven rotary means is drivingly connected to said motor.

8. The apparatus of claim 1 in which the means for oscillating the sets of baling bars includes driven rotary means, and first and second linkage means respectively connecting 180° opposed pivots on said rotary means to said first and second sets of baling bars.

9. The apparatus of claim 8 in which the means mounting the baling bars includes a link suspending the front of each baling bar from the frame, and in which the first and second linkage means include first and second parallel cross beams, respectively, which move in independent closed paths, the baling bars of the first set being directly pivotally connected to the first cross beam and the baling bars of the second set being directly pivotally connected to the second cross beam.

10. The apparatus of claim 1 in which the means for oscillating the sets of baling bars includes a cross shaft, and ground engaging wheels on the ends of said cross shaft.

11. The apparatus of claim 1 in which the means for oscillating the sets of baling bars includes a cross shaft, and a hydraulic motor for driving said cross shaft.

12. The apparatus of claim 1 in which the means mounting the baling bars includes a link suspending the front of each baling bar from the frame, and in which the means for oscillating the sets of baling bars includes first and second parallel cross beams on which the rearward portions of said first and second sets are respectively pivotally mounted, first and second linkage means operatively connected to said first and second cross beams, respectively, and means for driving said linkage means to move said cross beams in separate closed paths.

13. The apparatus of claim 12 in which the means for driving the linkage means includes driven rotary means, and means operatively connecting 180° opposed pivots on said rotary means to said first and second linkage means.

* * * * *

PO-1050
(5/69)

UNITED STATES PATENT OFFICE
CERTIFICATE OF CORRECTION

Patent No. 3,788,052      Dated January 29, 1974

Inventor(s) Keith D. Elwick

It is certified that error appears in the above-identified patent and that said Letters Patent are hereby corrected as shown below:

Page 1, after "Assignee:" delete "Starling" and substitute -- Starline, Inc., a corporation of Delaware --.

Signed and sealed this 12th day of November 1974.

(SEAL)
Attest:

McCOY M. GIBSON JR.            C. MARSHALL DANN
Attesting Officer               Commissioner of Patents